(12) United States Patent
Sessions

(10) Patent No.: US 9,515,549 B2
(45) Date of Patent: Dec. 6, 2016

(54) CAPLESS VOLTAGE REGULATOR USING CLOCK-FREQUENCY FEED FORWARD CONTROL

(71) Applicant: Microchip Technology Incorporated, Chandler, AZ (US)

(72) Inventor: D. C. Sessions, Phoenix, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 208 days.

(21) Appl. No.: 14/209,424

(22) Filed: Mar. 13, 2014

(65) Prior Publication Data

US 2014/0266317 A1    Sep. 18, 2014

Related U.S. Application Data

(60) Provisional application No. 61/784,737, filed on Mar. 14, 2013.

(51) Int. Cl.
*G05F 1/575* (2006.01)
*H02M 3/156* (2006.01)
*G05F 1/565* (2006.01)
*G05F 3/26* (2006.01)

(52) U.S. Cl.
CPC .............. *H02M 3/156* (2013.01); *G05F 1/565* (2013.01)

(58) Field of Classification Search
CPC .......... G05F 1/56; G05F 1/565; G05F 1/575; G05F 3/26
USPC ......................................... 323/273, 274, 275
See application file for complete search history.

(56) References Cited

U.S. PATENT DOCUMENTS

| | | | |
|---|---|---|---|
| 5,747,975 A * | 5/1998 | Colandrea | H03K 17/0822 323/276 |
| 6,175,221 B1 | 1/2001 | Kalpakjian et al. | 323/268 |
| 6,285,246 B1 | 9/2001 | Basu | 327/541 |
| 9,134,743 B2 * | 9/2015 | Bisson | G05F 1/575 323/280 |
| 2008/0169795 A1 | 7/2008 | Wang | 323/280 |
| 2010/0079437 A1 | 4/2010 | Tonomura | 345/211 |
| 2012/0062197 A1 | 3/2012 | Lüders et al. | 323/282 |
| 2012/0112718 A1 | 5/2012 | Pons | 323/281 |

FOREIGN PATENT DOCUMENTS

| | | | |
|---|---|---|---|
| CN | 101893908 A | 11/2010 | G05F 1/56 |
| CN | 102117089 A | 7/2011 | G05F 1/575 |
| CN | 102597900 A | 7/2012 | G05F 1/573 |
| FR | 2976369 A1 | 12/2012 | G05F 1/575 |

OTHER PUBLICATIONS

International Search Report and Written Opinion, Application No. PCT/US2014/026551, 17 pages, Nov. 3, 2014.
Chinese Office Action, Application No. 201480002565.1, 7 pages Jul. 28, 2016.

* cited by examiner

Primary Examiner — Gary L Laxton
(74) Attorney, Agent, or Firm — Slayden Grubert Beard PLLC

(57) ABSTRACT

A voltage regulator for controlling an output device in accordance with embodiments includes an error amplifier; a controlled conductance output device; and a load predicting circuit; wherein an output of the error amplifier and an output of the load predicting circuit are summed to control the output device.

15 Claims, 4 Drawing Sheets

CAPLESS VOLTAGE REGULATOR USING CLOCK-FREQUENCY FEED FORWARD CONTROL

CROSS REFERENCE TO RELATED APPLICATIONS

This application is a conversion of, and claims a benefit of priority from, U.S. Provisional Application No. 61/784,737 filed Mar. 14, 2013, which is hereby incorporated by reference in its entirety for all purposes as if fully set forth herein.

TECHNICAL FIELD

The present disclosure relates to voltage regulators and, particularly, an improved cap-less voltage regulator.

BACKGROUND

Voltage regulators are circuits designed to maintain a constant voltage output regardless of input or load conditions.

FIG. 1 is a diagram illustrating a conventional regulator. The regulator 100 compares a reference voltage 102 with a feedback voltage from the output 108 in a transconductance amplifier 104 to produce a current which is then multiplied by a current mirror 106 to yield a current which drives the output 108.

Clock switching places large load transients on such regulators, too quickly for them to respond. For example, on a clock switch, current demand can go from 75 µA to 75 mA in 4 ns. With a 15 nF load, this causes a supply change of 5 mV/ns. However, a typical regulator will only have around 100 mV margin at best.

While external capacitors can be used to provide enough charge to give the regulators time, but due to parasitics, only for relatively small transients. Further, in an integrated circuit environment, an external capacitor costs a precious pin while inviting assembly problems with regulatory consequences.

SUMMARY

These and other drawbacks in the prior art are overcome in large part by a system and method according to embodiments of the present invention.

Embodiments as described relate to an on-chip capless voltage regulator which is stable and rapidly responsive to load transients. Embodiments utilize knowledge of the instantaneous digital clock frequencies to anticipate load changes. Embodiments reduce the response time of a capless voltage regulator by providing it with the load's clock frequency and, optionally, power dissipation capacitance.

A voltage regulator for controlling an output device in accordance with embodiments includes an error amplifier; a controlled conductance output device; and a load predicting circuit; wherein an output of the error amplifier and an output of the load predicting circuit are summed to control the output device. In some embodiments, the load predicting circuit is a frequency to current converter. In some embodiments, the frequency to current converter implements an activity factor $K_{ACT}$ in the following equation:

$$I_{LOAD} = I_{LEAK} + I_{dyn}$$

Where
$I_{LOAD}$ is the current required by the load;

$I_{LEAK}$ is the leakage current required by the load (independent of other known factors); and $I_{dyn}$ is the dynamic current and is given by $I_{dyn} = (K_{ACT} * V_{DD} * C_{PD} * F_{CLK})$, where $K_{ACT}$ is the activity factor of the load (varies with operating conditions such as sleep mode);

$V_{DD}$ is the voltage supplied to the load;

$C_{PD}$ is the so-called "power dissipation capacitance" characteristic of the load (mostly invariant);

$F_{CLK}$ is the frequency of the clock driving the load.

In some embodiments, the error amplifier comprises a transconductance amplifier having a low-gain high-speed path and a high-gain low-speed path. In some embodiments, the load predicting circuit comprises a plurality of frequency to current converters scaled by a mask circuit. In some embodiments, the load predicting circuit includes a transimpedance device to produce an output voltage.

Some embodiments may include an integrated circuit including such a voltage regulator. Other embodiments may include a method for producing such a voltage regulator. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Figure 1:
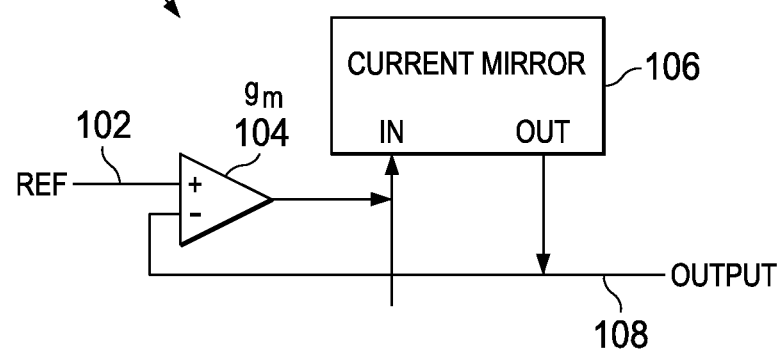
FIG. 1 illustrates an exemplary voltage regulator.
Figure 2:
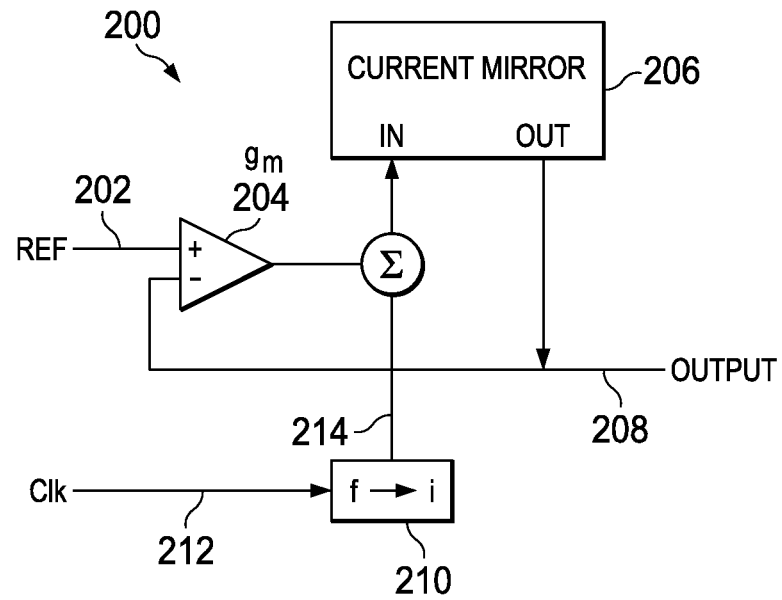
FIG. 2 illustrates a voltage regulator according to embodiments.

Turning now to the drawings and in particular to FIG. 2, a diagram of an example on-chip capless voltage regulator in accordance with embodiments is shown and generally identified by the reference numeral 200. The regulator 200 of FIG. 2 compares a reference voltage 202 with a feedback voltage from the output 208 in a transconductance amplifier 204 to produce a current which is then multiplied by a current mirror 206 to yield a current which drives the output 208.

In addition, a regulator 200 according to embodiments includes the clock(s) of the load(s) 212, which drive(s) (a) frequency-to-current converter(s) 210. The resulting current 214 is added to the output of the transconductance amplifier 204 to drive the current mirror 206 and thus output 208. The resulting improvement in performance results from eliminating the delay between a change in clock frequency at a load and a consequent change in system voltage.

The frequency to current converter 210 mimics a load function, i.e., the approximate load that the regulator will need to provide. For instance, a classic CMOS load will require the following current:

$$I_{LOAD} = I_{LEAK} + I_{dyn} \text{ Where}$$

$I_{LOAD}$ is the current required by the load;
$I_{LEAK}$ is the leakage current required by the load (independent of other known factors); and
$I_{dyn}$ is the dynamic current and is given by $I_{dyn} = (K_{ACT} * V_{DD} * C_{PD} * F_{CLK})$, where
$K_{ACT}$ is the activity factor of the load (varies with operating conditions such as sleep mode);
$V_{DD}$ is the voltage supplied to the load;
$C_{PD}$ is the so-called "power dissipation capacitance" characteristic of the load (mostly invariant);
$F_{CLK}$ is the frequency of the clock driving the load.
That is, in some embodiments, the frequency to current converter 210 models the factor $I_{dyn}$. It is noted that other load functions can be mimicked (or modeled) similarly. The output of the predictor and the error amplifier are summed and control the output device.

Figure 3A:
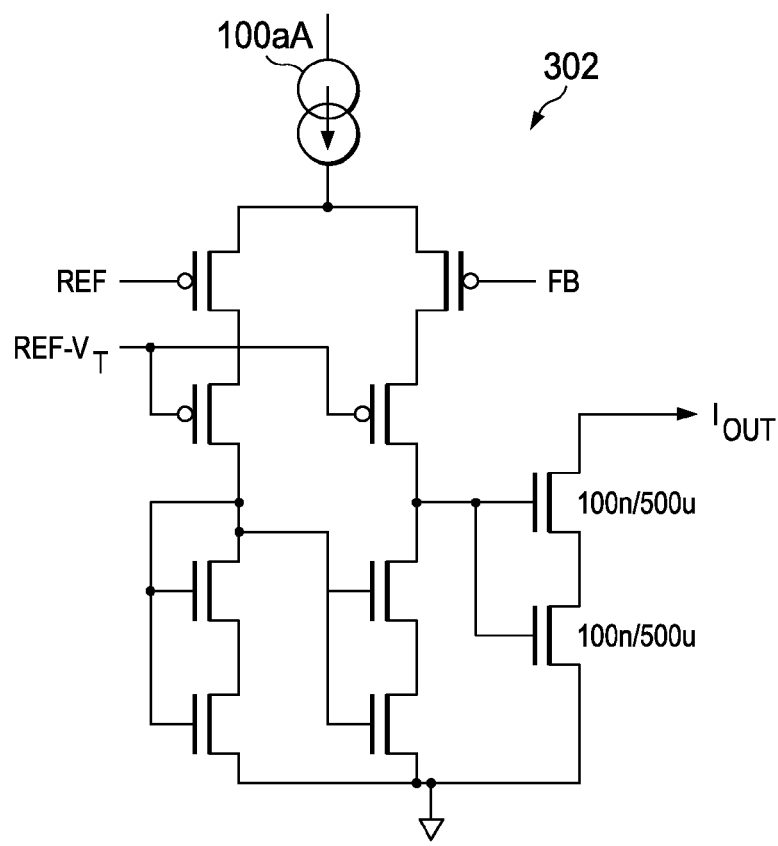
FIG. 3A-FIG. 3C illustrate components of a voltage regulator according to embodiments.
Figure 3A:
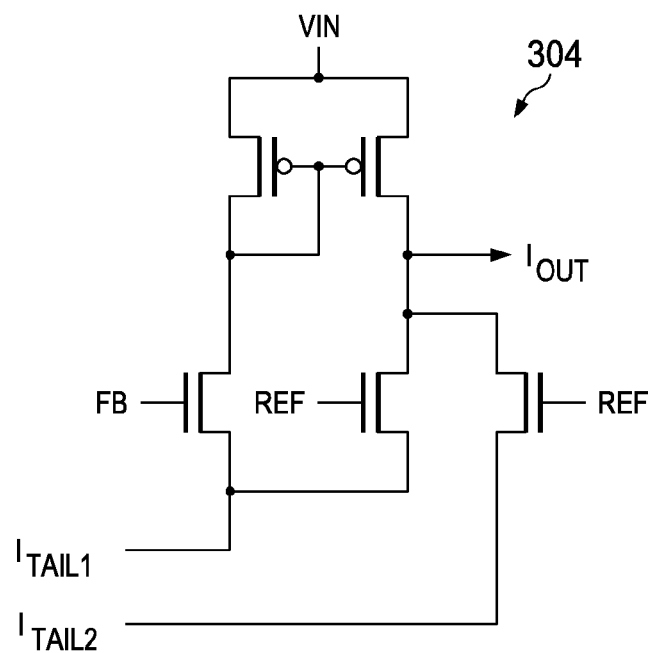

In some embodiments, the transconductance error amplifier is implemented with two paths: a low-gain, high-speed path comprising differential N-channel transistors and a low-speed high-gain path comprising differential P-channel transistors. Such as circuit is shown in FIG. 3A. In particular, an example of a simplified high gain, low bandwidth path is shown at 302 and an example of a simplified low gain, high bandwidth path is shown at 304. It is noted that other implementations are possible.

In the example illustrated, the high-gain low-bandwidth amplifier 302 is a four-transistor differential P-channel voltage amplifier (using cascodes on all four transistors) driving an N-channel controlled current source output. It has high voltage gain into the gate of the N-channel output device but due to very low current (the 100 nA tail current to the diff pair) and high output capacitance (the 100 micron wide and fairly long channel of the output device) it has a very slow response. Depending on the application it might be necessary to make it even slower.

Figure 3B:
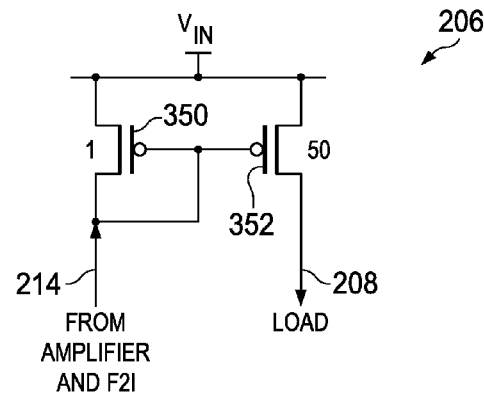

The low-gain high-bandwidth amplifier 304 is a current-steering transconductor. The differential n-channel devices compare the feedback to the reference and the P-channel mirror converts this into an output current of between + and − the tail current to the diff pair. The second input current gets added to the output to shift the range from (−tail to +tail) to (−2*tail to 0) so that the output never turns off the current mirror at the output of the regulator. An example P-channel pass transistor/current mirror is shown in FIG. 3B. In the example illustrated, the current mirror 206 includes transistor 350 and transistor 352 having a common gate. Transistor 350 is diode-connected as a load for currents driving the device. Transistor 352's drain is connected to the load 208. In some embodiments, the transistor 352 is larger than transistor 350. In some embodiments, this may be by a factor, e.g., of 50 to 1. The range of multiplication in the current mirror is a function of desired speed vs. acceptable power use in the regulator. Generally, a multiple greater than 10 and less than 1000 are practical, although these limits are only rule of thumb. The common source of the two transistors 350, 352 is coupled to the input power source.

Figure 3C:
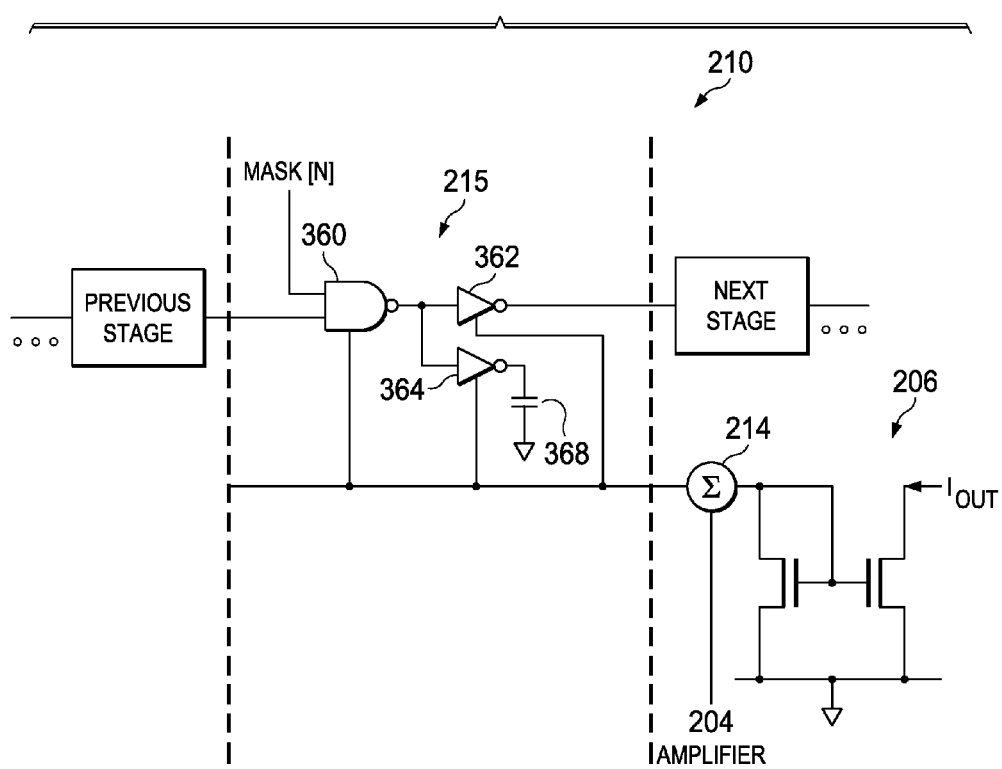

In some embodiments, the frequency to current converter 214 comprises a plurality of stages. An example of a stage is shown in FIG. 3C. In the example illustrated, the stage includes NAND gate 360, load capacitor 368, and inverters 362, 364. Each stage receives as an input to NAND gate 360 the output of inverter 362 (the first stage being driven by the system clock (not shown)). In addition, the NAND gate 360 receives a MASK input to scale the $K_{ACT}$ factor. Applying the mask to any stage prevents later stages from switching. It is noted that other implementations of a frequency to current converter are possible.

Figure 4:
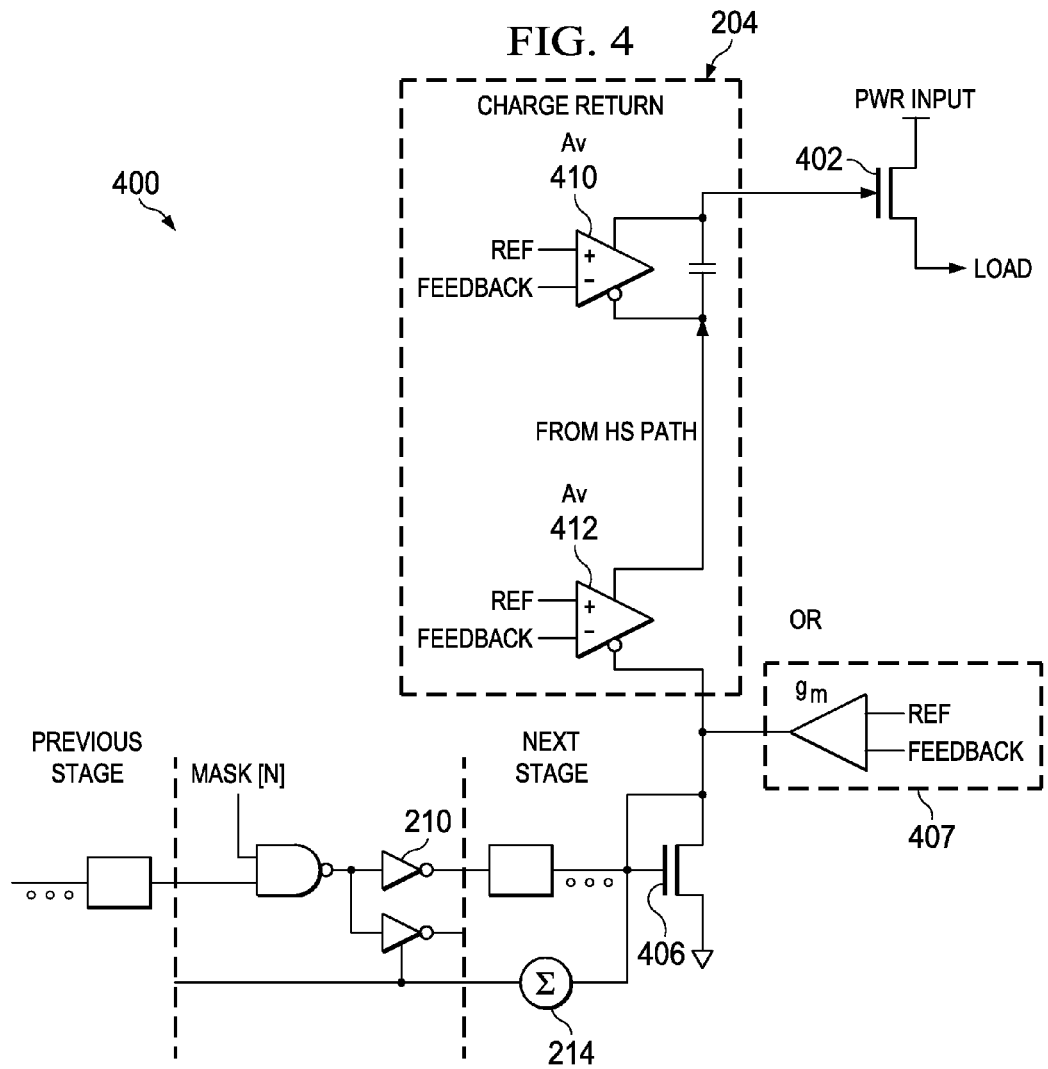
FIG. 4 illustrates a voltage regulator according to embodiments.

Another embodiment is shown in FIG. 4. In particular, the circuit 400 includes frequency to current converter 210 with an output provided to transimpedance device 406 to provide an output voltage instead of an output current. In the embodiments illustrated, the transconductance amplifier 204 is implemented with a high speed path 412 and a low speed path 410. The low speed path includes a controlled charge pump with its output across a floating capacitor coupling the high speed path 412 and predictor device (frequency to current converter 210) output to the input of transistor 402. The transistor 402 is a single large transistor in common drain configuration. Its drain is to the input power source, the gate is the control node and the source to the load. In addition, in some embodiments, the amplifier 407 may be used to implement high speed path 412.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A voltage regulator for controlling an output device, comprising:
    an error amplifier;
    a controlled conductance output device; and
    a load predicting circuit;
    wherein an output of the error amplifier and an output of the load predicting circuit are summed to control the controlled conductance output device; and
    wherein the load predicting circuit is a frequency to current converter.

2. The voltage regulator in accordance with claim 1, wherein the frequency to current converter implements a first activity factor KACT in the following equation:

$$ILOAD = ILEAK + Idyn$$

Where
ILOAD is a current required by the load;
ILEAK is a leakage current required by the load; and
Idyn is a dynamic current and is given by Idyn= (KACT*VDD*CPD*FCLK), where
KACT is a second activity factor of the load varies with operating conditions;
VDD is a voltage supplied to the load;
CPD is a substantially invariant power dissipation capacitance characteristic of the load;
FCLK is a frequency of a clock driving the load.

3. The voltage regulator in accordance with claim 1, wherein the error amplifier comprises a transconductance amplifier having a low-gain high-speed path and a high-gain low-speed path.

4. The voltage regulator in accordance with claim 1, wherein the load predicting circuit comprises a plurality of frequency to current converters scaled by a mask circuit.

5. The voltage regulator in accordance with claim 4, wherein the load predicting circuit includes a transimpedance device to produce an output voltage.

6. A method for controlling an output device, the method comprising:
    providing an error amplifier;
    providing a controlled conductance output device; and
    providing a load predicting circuit;
    wherein an output of the error amplifier and an output of the load predicting circuit are summed to control the controlled conductance output device; and
    wherein the load predicting circuit is a frequency to current converter.

7. The method in accordance with claim 6, wherein the frequency to current converter implements a first activity factor KACT in the following equation:

$$ILOAD = ILEAK + Idyn$$

Where
ILOAD is a current required by the load;
ILEAK is a leakage current required by the load; and
Idyn is a dynamic current and is given by Idyn= (KACT*VDD*CPD*FCLK), where
KACT is a second activity factor of the load varies with operating conditions;
VDD is a voltage supplied to the load;
CPD is a substantially invariant power dissipation capacitance characteristic of the load;
FCLK is a frequency of a clock driving the load.

8. The method in accordance with claim 6, wherein the error amplifier comprises a transconductance amplifier having a low-gain high-speed path and a high-gain low-speed path.

9. The method in accordance with claim 6, wherein the load predicting circuit comprises a plurality of frequency to current converters scaled by a mask circuit.

10. The method in accordance with claim 9, wherein the load predicting circuit includes a transimpedance device to produce an output voltage.

11. An integrated circuit device including an on-chip voltage regulator, the on-chip voltage regulator comprising:
    an error amplifier;
    a controlled conductance output device; and
    a load predicting circuit;
    wherein an output of the error amplifier and an output of the load predicting circuit are summed to control the controlled conductance output device; and
    wherein the load predicting circuit is a frequency to current converter.

12. The integrated circuit device in accordance with claim 11, wherein the frequency to current converter implements a first activity factor KACT in the following equation:

$$ILOAD = ILEAK + Idyn$$

Where
ILOAD is a current required by the load;
ILEAK is a leakage current required by the load; and
Idyn is a dynamic current and is given by Idyn= (KACT*VDD*CPD*FCLK), where
KACT is a second activity factor of the load varies with operating conditions;
VDD is a voltage supplied to the load;
CPD is a substantially invariant power dissipation capacitance characteristic of the load;
FCLK is a frequency of a clock driving the load.

13. The integrated circuit device in accordance with claim 11, wherein the error amplifier comprises a transconductance amplifier having a low-gain high-speed path and a high-gain low-speed path.

14. The integrated circuit device in accordance with claim 11, wherein the load predicting circuit comprises a plurality of frequency to current converters scaled by a mask circuit.

15. The integrated circuit device in accordance with claim 14, wherein the load predicting circuit includes a transimpedance device to produce an output voltage.

* * * * *